Oct. 11, 1932.    J. S. WALLIS    1,882,104

TRAY CONSTRUCTION FOR BUBBLE TOWERS

Filed March 20, 1931

INVENTOR.
John S. Wallis
BY
Thos. E. Scofield
ATTORNEY.

Patented Oct. 11, 1932

1,882,104

UNITED STATES PATENT OFFICE

JOHN S. WALLIS, OF NEW YORK, N. Y., ASSIGNOR TO ALCO PRODUCTS, INCORPORATED, OF NEW YORK, N. Y., A CORPORATION OF NEW YORK

TRAY CONSTRUCTION FOR BUBBLE TOWERS

Application filed March 20, 1931. Serial No. 523,996.

This invention relates to improvements in a tray construction for bubble towers and refers more particularly to the fabrication and construction of trays for towers in which vapors and liquids are caused to counterflow in order to obtain an intimate contact between the two fluids.

The tray construction is particularly adapted for use in the oil industry and in connection with any process wherein vapors and liquids are contacted in order to procure fractionation or dephlegmation of the vapors and a heat exchange between the vapor and liquid mediums.

The novelty in the invention lies primarily in the construction details, offering advantages from a manufacturing point of view and from an installation or erecting standpoint in the field or on the job.

Figure 1:
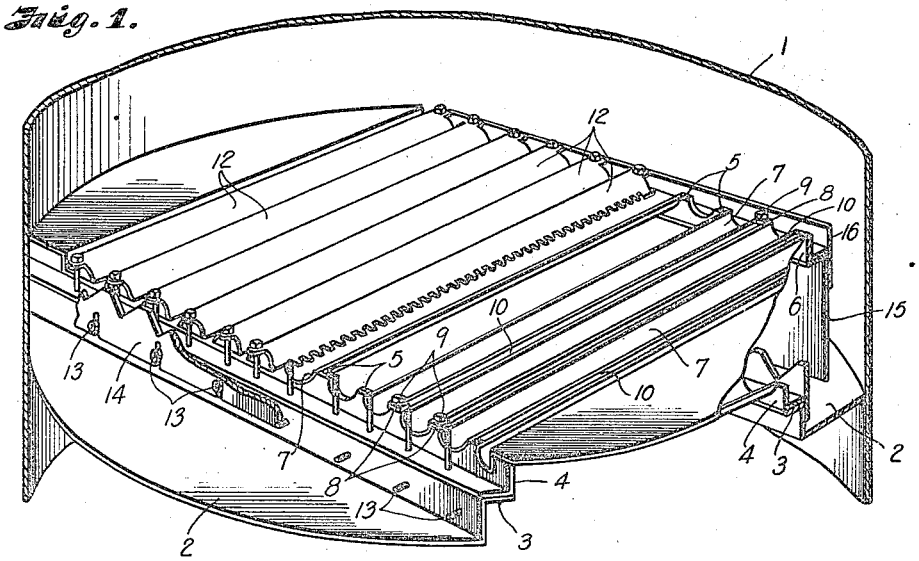
Fig. 1 is a perspective view of the tray construction with parts in section and parts broken away.
Figure 2:
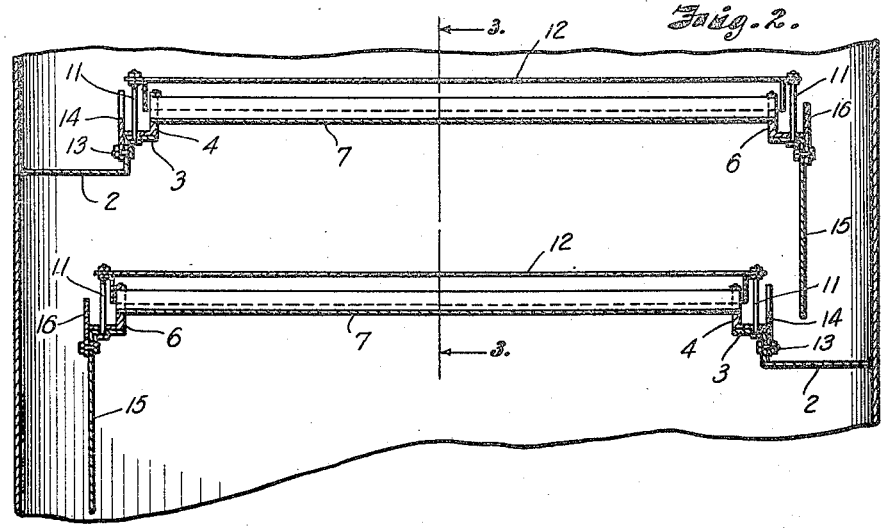
Fig. 2 is a cross sectional view showing two of the trays.

The tray construction is adapted for use in any type bubble tower or fractionating tower, consisting of a vertical, cylindrical vessel, varying in diameter and height according to the particular work to be done, the volume of vapors to be handled and the amount of fractionation necessary. A bubble or fractionating tower is equipped, either centrally or near its lower portion with a vapor inlet line and a vapor outlet near or in the top of the tower. Means may be supplied for introducing liquid condensate into the top of the tower or closed coils may supplement the trays to increase fractionation of the vapors. In the bottom of the tower is a liquid drawoff line.

All the above details with reference to the operating requirements of the tower itself have been eliminated from the drawing in the interest of simplicity and due to the fact that structural requirements of a fractionating tower have long been well known in the art, particularly with reference to the fractionation of oils, alcohols and other mediums.

The showing in the drawing has been restricted to two trays, as the construction of the remaining trays is identical. It will be understood that any number of trays may be positioned in the tower, according to the requirements of the particular installation.

In the drawing the tower is designated by the numeral 1. Welded, bolted, or otherwise affixed to the interior of the tower are a plurality of metal arcs 2, which are arranged in staggered relation, being positioned on opposite sides of the tower and at different heights. The arcs extend but a short distance into the tower and terminate in the form of angle bars designated by the numerals 3. To the upper or horizontal flanges of the angles are affixed angle cross members 4, the horizontal flanges of the angles 4 coinciding with the horizontal flanges of the angles 3. The upright or vertical flanges of the angles 4 have cut therein semicircular depressions. The semicircular depressions are spaced apart to form flat top cap or hood supports 5. On the opposite sides of the tower from the arcs 2 are placed angle cross members 6, the vertical flanges of which are cut with semicircular depressions identical to those cut in the vertical flange of the cross members 4. The depressions in the cross members 4 and 6 are arranged in alignment and in these depressions are placed the semicircular troughs 7. These troughs are held in place by rectangular plates and screw bolts 9, mounted upon the members 5 or the flat top portions between the depressions; the edges of the plates 8 extend over the lips of the troughs to prevent displacement. The lips of the troughs are spaced apart, forming passageways therebetween which passageways are designated by the numerals 10, and form the risers or passages for the vapors which rise from tray to tray in their travel through the tower. Extending through the horizontal flanges of the members 4 and 6 are bolts 11 which support a plurality of hoods or caps 12. These hoods or caps are spaced above the vapor passages 10 so that the skirts of the hoods, which are preferably serrated as shown in Fig. 1, extend down into the liquid troughs 7. Thus the vapor rising through the openings 10 has its direction reversed by the hoods and is caused to percolate or bubble through the liquid contained in the troughs. Affixed to the vertical portions of the angles 3 at the ends of the arcs 2 by means of bolts 13 are plates 14 which have saw-tooth upper edges. The depressions between the teeth are arranged in alignment with the troughs 7 so that the liquid accumulating upon the arcs 2 flow through the depressions into the troughs.

At the opposite end of the trays or troughs 7 are depending baffles 15 which are bolted to the horizontal flanges of the cross members 6 and extend downwardly into the pools of liquid which accumulate on the arcs 2. Also, at the same end of the trays or troughs are weirs 16 over which the liquid overflows. These weirs maintain the liquid at proper height on the trays and assure sufficient liquid in the trays to effect an intimate contact or bubbling of the vapors through the liquid in its passage through the liquid in the successive trays of the tower. In the drawing, the weirs are bolted to the baffles 15, but it will be appreciated that the construction details or the method of fastening is entirely arbitrary with the manufacturer.

The trays are arranged horizontally at different heights in the tower, the liquid overflowing the weirs 16 of each tray to accumulate on the metal arc 2 of the tray below. As the level of the pools raise above the V-shaped cutout portions in the plates 14, the liquid passes into the troughs 7 where it accumulates at a level determined by outlet weir 16 on each tray.

In operation a liquid level is maintained on each tray and the vapor rising through the tower through the slots or elongated openings 10 has its direction reversed by the hoods or caps 12 on each tray, and is caused to bubble through the pools of liquid maintained in the troughs 7.

Figure 3:
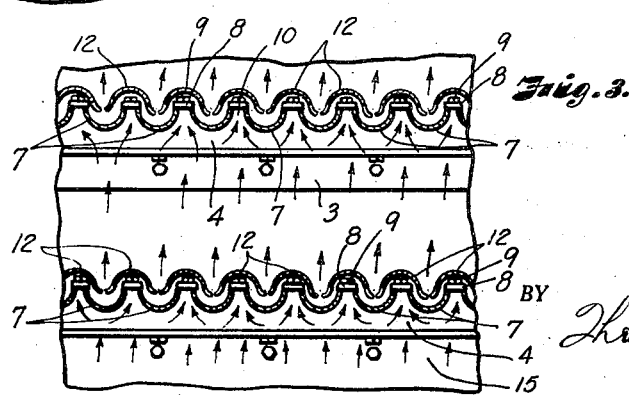
Fig. 3 is a view taken along the line 3—3 in Fig. 2, looking in the direction of the arrows.

Both the troughs and the caps are preferably semicircular in form, reducing to a minimum the friction presented to the vapors and therefore reducing the pressure differential between the bottom and the top of the tower. This stream line design of the troughs and caps or hoods is probably best shown in Fig. 3.

The ease with which the troughs and the hoods may be assembled or replaced offers a further advantage in that different types of metals may be used in the supports and the troughs or cap members. For example, the arcs 2, as well as the baffles and weirs, may be constructed of cast iron, while the troughs and hoods may be of pressed steel or an alloy of steel rendered non-corrosive by the use of non-corrosive alloys.

It will be appreciated that the details of construction may be easily varied without departing from the scope of the invention.

Primarily, the novelty lies in the use of a plurality of semicircular troughs having their joining edges spaced apart to form the vapor slots, while over these slots are arranged the semicircular hoods which extend the length of the troughs and providing trays of this character with an outlet weir of a height sufficient to maintain the liquid in the troughs at a proper level, these trays so arranged that the overflow liquid is coursed from one tray to the next tray below and passed over each succeeding tray below in the manner described.

In order that the liquid which serves as a condensing medium may be maintained upon the bubble trays at a relatively uniform liquid level, it is essential that the pools of liquid on each of the trays adjacent the inlet ports to the trays have a level slightly above the level maintained at the outlet weir. This pressure head of liquid is created behind the depending baffles designated by the numbers 15. This difference in head is increased as the resistance to liquid flow is increased. It is this difference in head between the inlet and the outlet of the trays which creates the movement of the liquid across the trays in a uniform flow. Any departure from horizontal positioning of the trays to produce flow would obviously result in a difference in depth of the liquid level on the trays, causing differences in the resistance to the flow of the vapors and the resulting channeling of the vapors toward one side of the tower and an unequal distribution of the vapor passing through the respective trays.

In the design of tower shown, the liquid flows through an unvarying cross section with no projections or restrictions between the caps or hoods which gives a lower frictional resistance than if the liquid was passed through a tortuous path.

It is also to be noted that, by utilizing the hemispherical design of trough and hood, the friction between the liquid and metallic surface is reduced to a minimum as the hemispherical shape gives the minimum square feet of metallic surface per unit volume of flowing liquid. These factors tend to reduce the friction, and will keep the static head between the ends of the trays almost equal.

Although these factors are not so important with reference to atmospheric towers, in vacuum operation the vapor volume is considerably greater and the liquid volume remains approximately the same. Therefore, it is of the utmost importance in volume operation to have the liquid distribution as even as possible to prevent tendency of the vapors to concentrate in their passage through the tower into sections where the liquid resistance is less. Such concentration of the vapors would obviously reduce the effectiveness of the apparatus and efficiency of operation.

I claim as my invention:

1. A bubble tray for effecting intimate contact of liquid and vapor comprising a plurality of spaced apart uninterrupted liquid troughs, the openings between the troughs forming the vapor passages, hoods over the vapor passages having their skirts extending into the troughs, means for introducing liquid uniformly into the troughs from one end thereof and means at the opposite end of the troughs for maintaining a predetermined liquid level therein.

2. Bubble tray construction for fractionating towers comprising a plurality of horizontally positioned continuous troughs spaced apart to form vapor risers therebetween, hoods capping the vapor risers, their edges extending into the troughs, means for introducing liquid uniformly into the troughs and means common to all said troughs positioned at the overflow end thereof for maintaining a predetermined liquid level in the troughs.

3. Bubble tray construction for fractionating towers comprising a plurality of horizontally positioned continuous troughs spaced apart to form vapor risers therebetween, hoods capping the vapor risers, their edges extending into the troughs, means for introducing liquid uniformly into the troughs and means common to all said troughs positioned at the overflow end thereof for maintaining a predetermined liquid level in the troughs, and baffles intermediate the trays for preventing the mixing of the vapor above any tray with the downflowing liquid from the tray above.

4. Bubble tray construction for fractionating towers comprising a plurality of horizontally positioned troughs separately removable, said troughs spaced apart to form vapor passages therebetween, removable hoods capping the vapor risers, their edges extending into the troughs, means for accumulating a pool of liquid at one end of the troughs and means for uniformly introducing the liquid to the separate troughs, weirs at the overflow end of the troughs for maintaining predetermined liquid level in the troughs, and means for preventing the mixing of the vapors above any tray with the down-flowing liquid from the tray above.

5. A bubble tray for effecting intimate contact of liquid and vapor comprising supports, a series of spaced semi-circular notches in said supports, a plurality of longitudinally disposed semi-circular troughs seated in said notches and extending between said supports in spaced relationship, whereby the edges of adjacent troughs form stream line vapor risers, a plurality of semi-circular hoods positioned over said vapor risers having their edges extending into said troughs whereby stream line exit passages are formed.

In testimony whereof I affix my signature.

JOHN S. WALLIS.